United States Patent
Sedmalis et al.

(10) Patent No.: US 11,564,397 B1
(45) Date of Patent: Jan. 31, 2023

(54) PROCESS FOR MAKING BAGEL PRODUCTS

(71) Applicants: Andris Sedmalis, Riga (LV); Alan Amron, Quogue, NY (US)

(72) Inventors: Andris Sedmalis, Riga (LV); Alan Amron, Quogue, NY (US)

(73) Assignee: CANNELLE BAKERY, LTD., Saldus (LV)

( * ) Notice: Subject to any disclaimer, the term of this patent is extended or adjusted under 35 U.S.C. 154(b) by 0 days.

(21) Appl. No.: 17/136,655

(22) Filed: Dec. 29, 2020

(51) Int. Cl.
*A21D 2/36* (2006.01)
*A21D 8/04* (2006.01)
*A21D 6/00* (2006.01)
*A21D 15/02* (2006.01)

(52) U.S. Cl.
CPC ........... *A21D 2/368* (2013.01); *A21D 6/00* (2013.01); *A21D 8/047* (2013.01); *A21D 15/02* (2013.01)

(58) Field of Classification Search
CPC .......... A21D 2/368; A21D 6/00; A21D 8/047; A21D 15/02
See application file for complete search history.

(56) References Cited

U.S. PATENT DOCUMENTS

| | | | | | |
|---|---|---|---|---|---|
| 1,258,793 | A * | 3/1918 | Lovelace | ........... | A21D 8/02 426/62 |
| 1,438,441 | A * | 12/1922 | Johnson | ........... | A21D 8/02 426/60 |
| 1,643,011 | A * | 9/1927 | Hill | ........... | A21D 8/047 426/62 |
| 4,657,769 | A * | 4/1987 | Petrofsky | ........... | A21D 2/22 426/549 |
| 4,666,719 | A * | 5/1987 | Spiller | ........... | A21D 8/045 435/252.4 |
| 5,182,123 | A * | 1/1993 | Edo | ........... | A21D 13/14 426/94 |
| 5,346,715 | A * | 9/1994 | Fertel | ........... | A21D 8/02 426/524 |
| 8,435,578 | B1 * | 5/2013 | Baggett | ........... | A21D 8/00 426/62 |
| 2005/0031733 | A1 * | 2/2005 | Domingues | ........... | A21D 8/02 426/19 |
| 2005/0163885 | A1 * | 7/2005 | Rees | ........... | A21D 10/00 426/19 |
| 2008/0063755 | A1 * | 3/2008 | Gan | ........... | A23L 5/34 426/95 |
| 2012/0045544 | A1 * | 2/2012 | Xie | ........... | A21D 8/047 426/62 |
| 2019/0191724 | A1 * | 6/2019 | Cai | ........... | A21D 17/006 |

OTHER PUBLICATIONS

L.V. Anderson "You're Doing It Wrong: Bagels" https://slate.com/culture/2014/04/authentic-bagel-recipe-you-need-barley-malt-syrup-and-boiling-water.html. (Year: 2014).*
Lee (KR 2003094985 A Derwent abstract) (Year: 2003).*
Nakamura et al. (JP JP02002136255A Derwent abstract) (Year: 2002).*

* cited by examiner

*Primary Examiner* — Felicia C Turner
(74) *Attorney, Agent, or Firm* — Christopher J Vandam, PA; Chris Van Dam

(57) ABSTRACT

Bagel products are formed by (a) mixing flour and water together with yeast to form a sourdough; (b) preparing an activated malt extract by mixing barley malt extract, a second amount of yeast, and water; (c) mixing the sourdough, the activated malt extract, and salt with flour to form a final dough; forming bagel shapes from the final dough; (d) fermenting the shapes for at least 30 minutes at around room temperature, and then further fermenting and storing the shapes for at least 10 hours under refrigeration at a temperature of from about +2° C. to about +8° C.; (f) boiling the shapes one side at a time or, in an initial baking step, baking the shapes in a steam environment; (g) baking, in a final baking step after the boiling or initial baking step, the formed bagel shapes; and, optionally, (h) freezing the baked bagel shapes.

17 Claims, No Drawings

PROCESS FOR MAKING BAGEL PRODUCTS

BACKGROUND OF THE INVENTION

Field of the Invention

Embodiments of the present invention generally relate to dough products and, more particularly, to a process for preparing dough products such as bagels which, after baking, are suited to being served fresh but at the same time adapted to be frozen for storage for subsequent thawing to room temperature and/or toasting, in each case presenting a bagel product having a fresh flavor and traditional texture despite undergoing a freeze/thaw process before consumption.

Description of the Related Art

An important feature for the consumer of a food item is its ease of preparation. A number of convenience frozen foods, and particularly foods designed for quick baking or warming in an oven or toaster have been introduced. However, it is the quality of product which ultimately determines whether a consumer will re-purchase a food item or recommend that others do so. In that regard, efforts to develop a bagel which can be frozen, thawed, and served without sacrificing the texture, mouth feel, and taste of the classic "American" bagel—of the type commonly available throughout New York City and elsewhere—have been particularly unsuccessful.

Bagels are commonly hard rolls which are shaped like a donut i.e. circular with a hole in the center. They are made of raised dough in a process which includes simmering in boiling water which is followed by baking. The plain bagel has a glazed browned hard exterior over a firm white interior. The plain bagel can be varied by the addition of toppings and/or fillings or by selection of special dough, such as, pumpernickel.

The manufacture of bagels is a highly skilled specialized art. Normal baking techniques are not applicable to the production of bagels. Also, the shelf life of a baked bagel is relatively short. Therefore, the availability of fresh bagels is limited.

At the same time, consumer demand for bagels over the years has increased dramatically, and it has become important for supermarkets to be able to meet this demand through a supply of fresh bagels. Due to the skill needed to manufacture a bagel, the supermarkets are not able to fill this demand through its store bakeries. Many supermarkets are able to internally fulfill their entire fresh bakery needs except for bagels and croissants. The supermarkets have been required to purchase estimated quantities from local bakeries. Purchasing bagels from local bakeries has proved unsatisfactory due to the need to estimate quantities in order to avoid having too many extra stale bagels.

Others have recognized this problem but have been unsuccessful in producing a commercially acceptable product. Those who have attempted to solve this problem have produced bagels with an undesirable taste and/or which do not look like a proper bagel since they have a blistery exterior. In U.S. Pat. No. 4,657,769 issued on Apr. 14, 1987 to Petrofsky et al. and entitled "Method of Manufacturing Frozen Bagel Dough Products," there is disclosed a process for making frozen bagels. The process disclosed by Petrofsky et al uses a combination of oxidizers and boiling without baking prior to freezing, which purportedly contributed to a frozen bagel having a commercially viable shelf life and, when baked, the same characteristics of fresh bagels.

Unfortunately, the process of Petrofsky requires additional, time and space-consuming steps before there is a product ready to vend to a customer. When they are to be sold by a retailer they must be allowed to stand at room temperature for thirty to forty minutes, or placed in a proof box for twenty minutes, 100 degrees F. humidity 90%. They must then be washed with a solution of 50% raw whole egg and 50% water. Only then may toppings be added, and thereafter they must be baked for 20-25 minutes.

One other option which has been available to the reseller has been to offer frozen, pre-baked bagels. A long-recognized problem with conventional, frozen pre-baked bagels is that they must be reheated by the consumer before they can be eaten but, once reheated, they become extremely hard within a matter of hours. By the time the consumer is prepared to consume the bagels, they are often inedible. Moreover, instead of the desired traditional bagel texture, conventional, frozen pre-baked bagels must be toasted for palatability, or they have a bland "white bread" taste and appearance when ready to serve upon thawing.

Therefore, there is a continuing and long-standing need for a bagel which can be stored for long periods and purchased by consumers, in a frozen condition, so that it may be served after thawing (e.g. by standing for at least one hour at room temperature) and/or toasting as needed.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to embodiments of the present disclosure, bagel products are formed which are both ready-to-eat fresh for up to three to six days after baking and ready-to-freeze after such baking—for subsequent thawing and/or toasting—while retaining a traditional bagel flavor, mouth feel, and texture. In an embodiment, bagel product are formed (a) by mixing flour and water together with yeast to form a sourdough; (b) preparing an activated malt extract by mixing barley malt extract, a second amount of yeast, and water; (c) mixing the sourdough, the activated malt extract, and salt with flour to form a final dough; (d) fermenting and/or proofing the final dough until it has risen to at least one third an original volume; (e) dividing and forming the cooled, final dough into product shapes; (f) cooling down the formed product shapes in a +2° C. to +8° C. environment for at least 10 hours; boiling the product shapes on both sides or, optionally, baking the product shapes in an initial baking step; (h) baking after the boiling or initial baking step, the product shapes; and (i) freezing the product shapes after the final baking step.

In an embodiment, the product shapes formed from the final dough are cooled and stored for between 12 to 14 hours in a +2° C. to +8° C. environment before baking.

DETAILED DESCRIPTION OF EMBODIMENTS

The present disclosure describes a process for manufacturing bagel products which, in a frozen form available to consumers at the point of sale, can be thawed for consumption just as a "fresh" bagel can, or before or after such thawing, toasted, but which nonetheless possess all the characteristics of a fresh, bakery bagel. Such characteristics are not shared by conventional "partially baked" bagel products. For example, after thawing at one hour at room temperature, frozen bagels prepared in accordance with the teachings of the present disclosure are ready to eat and at the peak of their flavor. The mouth feel and taste have been determined to last for six to eight hours from the time they are thawed and removed from the plastic bag in which they were placed. Left thawed but within the bag, they remain edible for up to five days.

As reference the following is a typical procedure for manufacturing bakery bagels in accordance with the prior art:

Step 1: The following ingredients are put into a mixer containing a dough hook and mixed for 8-10 minutes at room temperature (60-95 degrees F.):
(a) 100 lbs. of high gluten bleached malted barley flour;
(b) 48 lbs. water;
(c) 6 lbs. sugar or 2 lbs. malt;
(d) 2 lbs. salt;
(e) 4½ lbs. vegetable oil (optional); and
(f) 4 oz. to 1 lb. yeast Step 2: When the dough has reached an extendable condition i.e. won't tear during molding since it is stretchable it is placed on a pan Step 3: From the pan, the dough is either hand shaped into bagels or placed in a divider and then into a former. The divider separates the dough into bagel size portions and the former shapes the dough into the donut shape.

Step 4: The shaped dough pieces are placed on pans which have been coated with corn meal to prevent sticking.

Step 5: The dough pieces are either placed in a refrigerator (40 degrees F.) for storage or allowed to proof or rise at room temperature for 45 minutes to two hours (if refrigerated they must be brought back to room temperature before further processing).

Step 6: The dough pieces are next cooked in water at 212 degrees F. for 30 seconds to 2 minutes until they float on the surface of the water. This provides the hard, shining exterior surface and cleans off the corn meal.

Step 7: The bagels are dried and then baked for 20 minutes at 380 degrees F. For appearance prior to baking they may be washed in solution containing 50% by volume raw whole eggs and 50% by volume water. These washed bagels may be coated with a topping, such as, poppy seeds.

Like Petrofsky et al, the inventors herein believe that conventional processes for preparing frozen bagel dough products are similar to the preceding, but differ in that the dough is "relaxed" between the divider and the former, protecting the dough from the outside air for five to ten minutes in order to allow the dough to again become extendable. The inventors herein also agree with Petrofsky et al that conventional processes for preparing frozen bagel dough products also differ from the above-described "fresh" baking process in that the bagel dough products are frozen for shipment after a partial baking process, with the bagels being subjected to treatment with heat and humidity, and then a final baking step, at the point of sale (e.g., at the supermarket). Such bagels have a very short commercial shelf life since after 4 to 6 hours they are too difficult to chew. Moreover, they lack the mouth feel, texture and appearance of the classic American-style bagel.

Embodiments consistent with the present disclosure advantageously provide a means of manufacturing frozen bagels which can be shipped from a central plant (or warehouse distribution center) to distant retail outlets or, alternatively, directly to the consumer. An advantage of bagel products produced according to embodiments of the present disclosure is that they need not be baked at the point of sale or even by the consumer prior to their consumption. Instead they can be thawed at room temperature and eaten as fresh, toasted after such thawing, or they can be toasted while still in a frozen condition. Frozen bagel products prepared in accordance with embodiments of the present disclosure also exhibit excellent shelf-life characteristics and allow complete inventory and cost control. A further advantage of bagel products made in accordance with embodiments of the present disclosure is that they have a taste, a texture, and mouth feel which consumers will readily accept as being consistent with those a classic American-style bagel.

The dough ingredients are generally based on the following formula by weight:
Flour: 40%-62%
Water: 55%-34%
Yeast: 0.36%-0.25%
Salt: 1.0%-1.7%
Malt Extract 2.7% to 4.24%

In accordance with an illustrative embodiment of the present disclosure, a yeast-containing sour dough is gently mixed and after live bubbles begin forming on its surface, the sour dough is combined with an activated malt extract, flour and salt to form, by mixing, a final dough ready for fermenting, shaping, baking, and, optionally, freezing. These constituents, and the manner in which they are mixed, are described below:

Sourdough

Preferably the sourdough ingredients are based on the following formula (by weight):

| Ingredient | Kilograms |
| --- | --- |
| wheat flour | 2.250 |
| water (at 20-25° C.) | 2.250 |
| yeast | 0.015 |

The wheat flour and water forming the sourdough are added in equal parts by weight, although the relative proportions of these two constituents may vary somewhat from one another (by 1-2 percent by weight in either direction). The three ingredients are mixed gently until smooth, and then left for approximately 10-12 hours at room temperature (at 20-25° C.), at which point live bubbles will appear on the surface of the sourdough. In an illustrative example, the sourdough was mixed in a spiral mixer for approximately three minutes at low speed.

Malt Extract Activation

Exemplary embodiments consistent with the present disclosure require the preparation and timely addition of an activated malt extract. An exemplary embodiment includes the following ingredients:

| Ingredient | Kilograms |
| --- | --- |
| dry yeast | 0.03 |
| water (approximately 0° C. to 50° C.) | 4.5.00 |
| malt extract | 0.54 |

Process for the formation of malt extracts are well known, and a variety of powdered and syrup forms are commercially available. While malt extracts can be made from any type of malted grain, the illustrative example depicted in the table above contemplates the use of an extract of malted barley, in the form of a syrup. The use of malt extracts derived from other grains such, for example, as malted wheat extract, may be attempted but such use is not certain to result in finished bagel products having a taste expected by, or acceptable to, consumers.

In an embodiment, water at a temperature of as close to 0° C. as possible without freezing is added to the yeast and malt extract.

Final Dough

According to an exemplary embodiment, the activated malt extract is prepared thirty minutes prior to preparing a final dough which includes sourdough formed as above, activated malt extract formed as above, as well as flour and salt. An exemplary composition of the final dough is as follows:

| Ingredient | Kilograms |
| --- | --- |
| sour dough | (as above + 10 to 12 hours) |
| activated barley malt extract | (as above + 30 minutes) |
| wheat flour | 10.00 |
| salt | 0.20 |

The wheat flour and salt are combined with the activated malt extract and sour dough, and these are mixed in a spiral dough mixer for ten minutes at slow speed and then two minutes at fast speed. In embodiments, preparation of the final dough from the sour dough, wheat flour, salt, and activated malt extract as described above is performed at room temperature (e.g. approximately 20-25° C.).

Dividing and Forming

When mixing has been completed, the dough is formed by hand or automatically by machine. In an embodiment, automatic forming of the dough is achieved by first passing the dough through a divider and, after dividing, allowed the dough to further ferment for another 15 minutes. Then, the dough is passed through a former to produce individual bagel shapes. In an illustrative embodiment, the dough is allowed to rest and ferment for two hours, and is then divided and shaped. The divided, fermented dough may be shaped by hand or forming equipment to obtain bagel shaped products.

Fermentation

Following the dough forming, ready-made bagel shapes are placed in plastic boxes or other material resistant to humidity and cold by hand. Then, the boxes are maintained at room temperature for 30 minutes to activate fermentation, when the bagel shapes have grown in volume by at least one third, they are refrigerated for further fermentation for at least 10-12 hours at a temperature of from about +2° C. to about +8° C.

In an embodiment, the product shapes formed from the final dough prepared in the manner described above are bagel shapes which are cooled and stored for between 12 to 14 hours at the +2° C. to +8° C. The inventors herein have determined that shorter periods of storage at this temperature range—before proceeding to the remaining process steps described below—yields a softer, less chewy final product than that which consumers associate with a product purchased fresh at a bakery (or other point of production/sale). For example, if one were to skip the cooling and storage step altogether and proceed directly from shaping to boiling of the product shapes, the result would be a product having a texture similar to soft, white bread.

Steam Baking or Boiling/Baking

In an embodiment, the formed bagel shapes are baked in a steam environment at a temperature of from about 280° C. to about 300° C., for 1 to 3 minutes, immediately after the final fermenting. Good results have been obtained, for example, by steam baking at a temperature of 290° C. for a duration of 2 minutes. In another embodiment, good results have been obtained by boiling the formed bagel shapes for a duration of two minutes in 100° C. water before a subsequent baking step. Following steam baking or boiling as described above, the bagel shapes may be baked at a temperature of from about 210° C. to about 235° C. In an exemplary embodiment, bagel products boiled for two minutes were baked at a temperature of 220° C. for 12 minutes. At this point, the bagels were fully baked and need not be baked again, even following a subsequent freezing process.

Modified Process

In an alternate embodiment, adapted for a line production process, the aforementioned fermenting process is modified to includes 30 to 40 minutes of allowing the dough to rest and ferment prior to passing the dough through a divider, and the dividing is followed by another 15 minutes of fermentation. The divided, fermented dough may then be shaped shape by hand or forming equipment to obtain bagel shaped products. In accordance with this embodiment, the shaped bagel products are placed in plastic boxes, stacked within a freezer, and maintained at a temperature of from about 2° C. to about 8° C. After 9-11 hours, the plastic boxes are removed from the freezer and maintained at room temperature for from about 40 to about 60 minutes. In accordance with this embodiment, the bagels are placed in boiling water (100° C.) for about four minutes (two minutes on each side). Following boiling, the bagels are baked at a temperature of from about 215° C. to about 225° C. for 10-14 minutes. Excellent results have been achieved by baking the boiled bagels at a temperature of 220° C. for 12 minutes, Freezing Once the fully baked bagels have cooled down to a temperature of from about 25° C. to about 35° C., after baking, they are sliced (if desired) and, unless they are to be consumed fresh within the next 3 to 5 days, they are deep and fast frozen. The inventors herein have determined that allowing the bagels to cool to a temperature of about 30° C. after baking produces bagels which, despite a freezing operation to accommodate storage, are characterized by the texture, feel, look, taste, bounce, and chewiness which consumers associate with fresh-baked bagels. Accordingly, in embodiments, the baked bagels are placed in a deep freezer for flash freezing as soon as the baked bagels cool to a temperature of about 30° C. The deep freezer maintains the bagels at a temperature of from about −30° C. to about −40° C. for a duration of about 18 to about 22 minutes, with around 20 minutes having been determined by the inventors herein to produce consistently excellent results.

Once the bagels have been flash-frozen in the above described manner, they are packed and stored at a temperature from about −18° C. to about −22° C., which temperature should be maintained throughout the various phases of distribution from warehouse to point of sale. After purchase by a consumer, the product may be thawed and consumed as they are, or they may be toasted, in each case presenting the consumer with a product which, despite having been frozen for a period of up to nine to twelve months, more closely achieves the characteristics of a fresh baked bagel than that obtained by a prior art process.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

In addition to the ingredients identified in the preceding examples, various toppings may be added prior to the freezing process such, for example, as poppy seeds, sesame seeds, sea salt, onion and/or garlic flakes, and any combination of the foregoing. As well, various seasonings such as onion salt, garlic salt, dried tomatoes or tomato powder, and the like may be added. In addition, the wheat flour used in the preceding examples may be replaced (partially or entirely) or augmented by whole wheat flour, pumpernickel flour, or rye flour).

Thus, while the foregoing is directed to embodiments of the present invention, other and further embodiments of the invention may be devised without departing from the basic scope thereof, and the scope thereof is determined by the claims that follow.

We claim:

1. A process for manufacturing frozen bagel products comprising the steps of:
   (a) mixing flour and water together with a first amount of yeast, to form a smooth sourdough, the first amount of yeast added being sufficient to result in the formation of live bubbles on the surface of the sourdough after about 10-12 hours at room temperature;
   (b) preparing an activated malt extract by mixing grain malt extract, a second amount of yeast, and water at a temperature of as close to 0° C. as possible without freezing and in an amount by weight substantially equal to the weight of the sourdough;
   (c) within about 30 minutes of preparing the activated malt extract: mixing the sourdough, the activated malt extract, and salt with flour at room temperature to form a final dough;
   (d) dividing and fermenting about 15 minutes and then forming the final dough into product shapes;
   (e) fermenting the formed product shapes for at least 30 minutes at room temperature and until the product shapes have grown in volume by at least one third and then refrigerating the product shapes for at least 10 hours at a temperature of from about +2° C. to about +8° C.;
   (f) one of boiling the product shapes or, in an initial baking step, baking the product shapes in a steam environment; and
   (g) baking, in a final baking step, after the boiling or initial baking step, the product shapes;
   (h) then freezing the product shapes.

2. The method according to claim 1, further including freezing the product shapes after the final baking step, wherein the freezing is commenced when the product shapes have reached a temperature of about 28° C. to about 32° C.

3. The method according to claim 2, wherein freezing the product shapes after the final baking step is commenced when the product shapes have reached a temperature of about 30° C.

4. The method according to claim 2, wherein the freezing is performed by placing the product shapes in a deep freezer maintained a temperature of from about −30° C. to about −40° C. for a duration of about 18 to about 22 minutes.

5. The method according to claim 4, wherein the freezing is performed by placing the product shapes in a deep freezer maintained a temperature of from about −35° C. to about −40° C.

6. The method according to claim 1, wherein fermenting the formed product shapes is performed at room temperature for at least 30 minutes.

7. The method according to claim 1, wherein refrigerating the product shapes at a temperature of from about +2° C. to about +8° C. is performed for at least 12 hours.

8. The method according to claim 7, wherein refrigerating the product shapes at a temperature of from about +2° C. to about +8° C. is performed between 12 to about 14 hours.

9. The method according to claim 1, wherein the product shapes are boiled by at least partial immersion in boiling water.

10. The method according to claim 1, wherein the products are boiled one side at a time.

11. The method according to claim 1, wherein the product shapes are steam baked at a temperature of from about 285° C. to about 295° C.

12. The method according to claim 11, wherein the steam baking is performed for a duration of 2 minutes.

13. The method according to claim 1, wherein flour and water combined with the first amount of yeast by adding flour and water in substantially equal parts by weight.

14. The method according to claim 1, wherein sufficient flour is added to form the final dough so as to be present in amount greater by weight than a combined weight of the sourdough and activated malt extract.

15. The method according to claim 1, wherein the malt extract comprises a barley malt syrup.

16. The method according to claim 1, wherein forming at least one of the sourdough or final dough includes adding at least one of wheat flour, whole wheat flour, rye flour, and pumpernickel flour.

17. The method according to claim 1, further comprising applying at least one of poppy seeds, sesame seeds, sea salt, onion flakes and/or garlic flakes to a surface of the formed product shapes prior to the final baking.

* * * * *